UNITED STATES PATENT OFFICE.

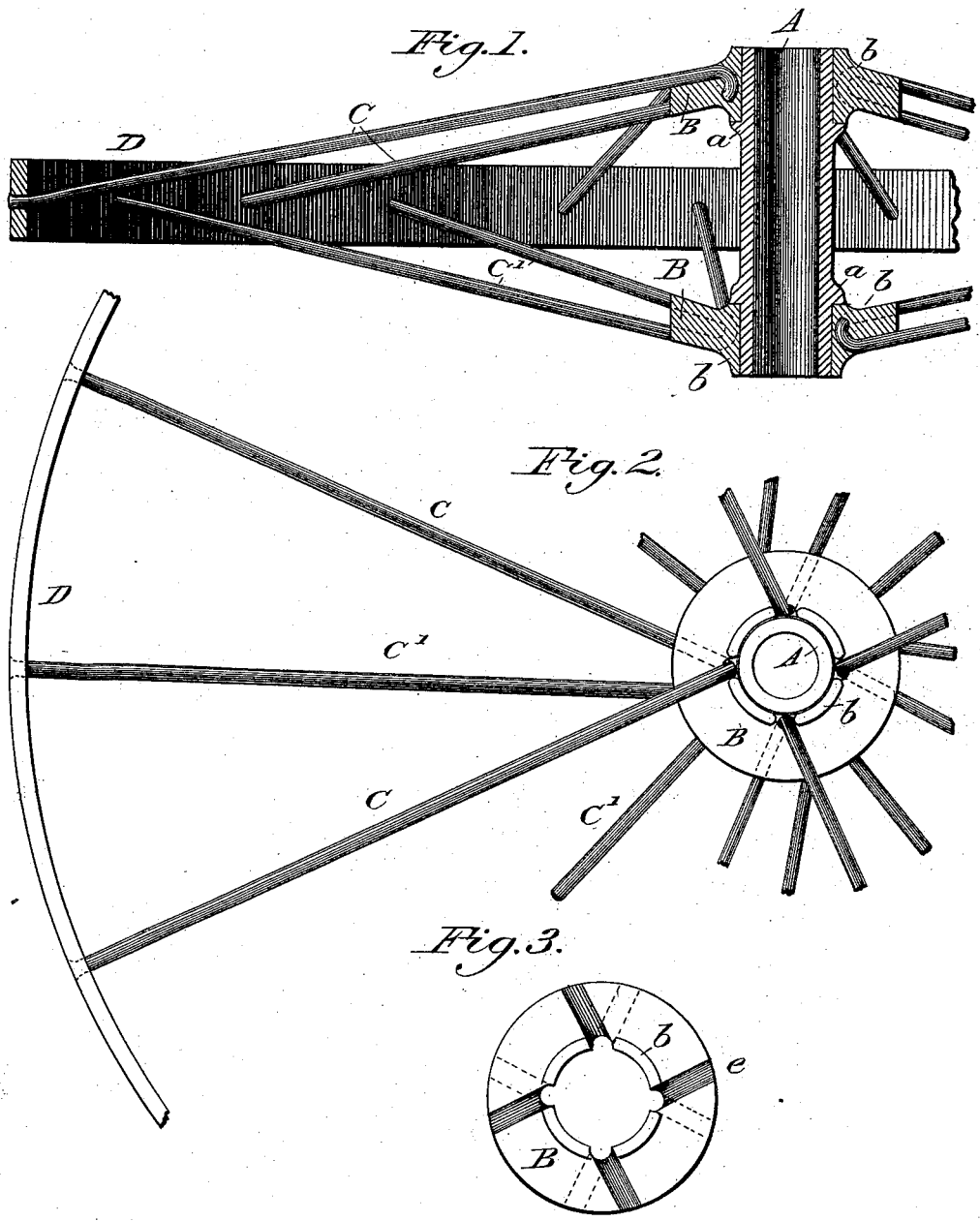

ARTHUR P. RICARD, OF TOLEDO, OHIO.

VEHICLE-WHEEL.

SPECIFICATION forming part of Letters Patent No. 375,426, dated December 27, 1887.

Application filed June 13, 1887. Serial No. 241,233. (No model.)

*To all whom it may concern:*

Be it known that I, ARTHUR P. RICARD, a citizen of the United States, residing at Toledo, in the county of Lucas and State of Ohio, have invented new and useful Improvements in Vehicle-Wheels, of which the following is a specification.

My invention relates to improvements in metal wheels for children's carriages, bicycles, velocipedes, &c.; and the objects of my invention are to provide a cheap, simple, and easily-constructed wheel, having the hub of it so constructed that the parts of it may be easily cast of metal. The manner in which I attain these objects is illustrated in the drawings hereto annexed, in which—

Figure 1 is a cross-section of the wheel, showing the longitudinal section of the hub and the spokes and rim on the one side. Fig. 2 is a side view of the wheel, showing the hub and the spokes and rim on one side. Fig. 3 is a side view of one of the rings or flanges.

In all of the views like letters refer to like parts.

A is a box having two short flange-like projections, *a a*, on the outside of it near each end.

B B are two flanges or collars which fit around the box A, one on each end and against the flange projection *a a*. These flanges B B are provided with a series of internal and lateral winding-grooves, *e e*, &c., varying in number according to the number of spokes desired in the wheel. They are also provided with slight internal and external projections, *b b*, between these grooves *e e*, &c. These grooves *e e*, &c., form a seating, in which the spokes C C and C' C' fit, one single piece of wire forming two spokes in each case, the ends being drawn up tight and riveted in the tire or rim D. This is what is properly termed a "suspension-wheel," in which the hub is suspended in the center of the rim by wire spokes drawn tight and riveted into the rim, the spokes from each end of the hub bracing alternately against each other. These flanges B B have a dish to them which varies according to the length of the hub and the diameter of the wheel, at all times taking the direction of the spokes when tight and in the right position.

I am aware that heretofore wheels have been constructed having an iron rim or tire with the wire spokes riveted into it, and having two spokes in one piece of wire, with the bend of the wire in the hub. I therefore do not claim such a construction, broadly; but

I claim as my invention the construction of the hub in its parts, and desire to secure it by Letters Patent, in which my claims are—

1. In a metal vehicle-wheel, the dished flanges B B, provided with a series of internal and lateral winding-grooves, *e e e*, and slight internal and external projections, *b b*, &c., between these grooves *e e*, in combination with the box A and spokes C C and C' C', substantially as shown and described.

2. In a metal wheel for vehicles, the combination of the tire D, spokes C C and C' C', the dished flanges B B, and box A, all substantially as shown and described.

In testimony whereof I have hereunto set my hand in the presence of two subscribing witnesses.

ARTHUR P. RICARD.

Witnesses:
JOSEPH N. CLOUSE,
WILLIAM H. TUCKER.